April 12, 1932. W. A. CHRYST 1,853,038
UNIVERSAL JOINT FOR SHOCK ABSORBERS
Filed July 16, 1928
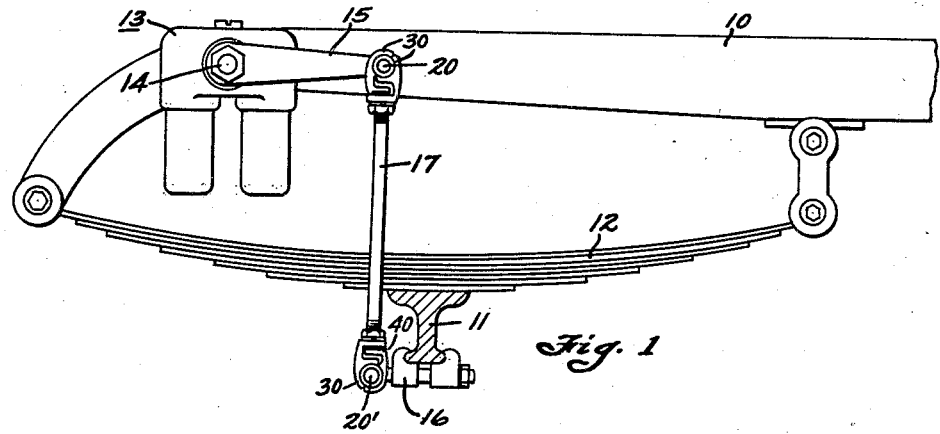
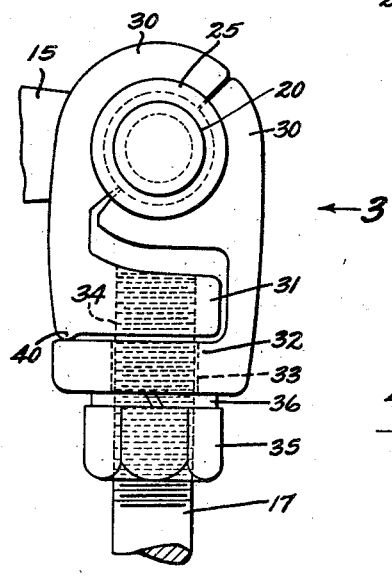
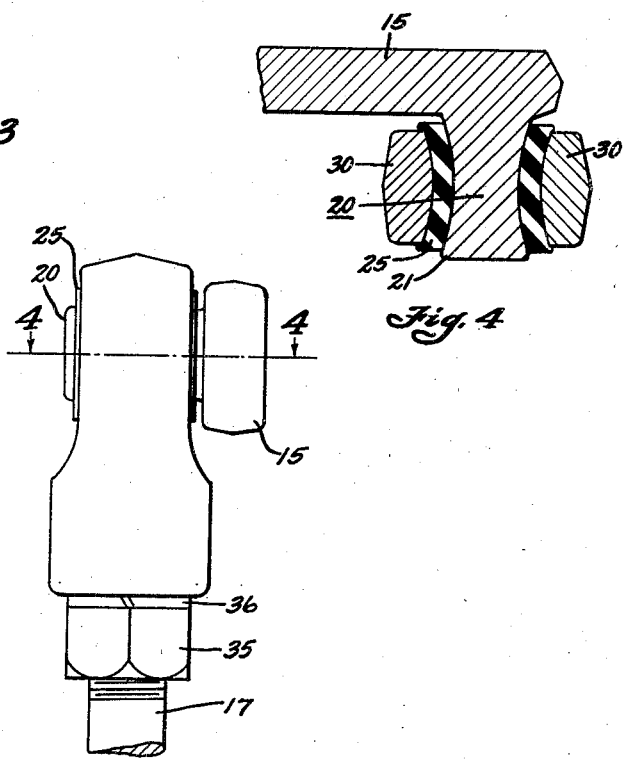
Inventor
William A. Chryst
By Spencer Hardman & Fehr
His Attorneys Patented Apr. 12, 1932

1,853,038

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

UNIVERSAL JOINT FOR SHOCK ABSORBERS

Application filed July 16, 1928. Serial No. 293,167.

This invention relates to a non-metallic pivot joint connecting two rigid metal members.

An object of this invention is to provide an improved form of pivot joint having a resilient, non-metallic bushing therein which provides for all relative movement between the parts by internal twist or distortion within the resilient material, whereby wear, rattle, and necessity for lubrication is avoided.

The chief features of the pivot joint of this invention are its economy of manufacture and efficiency and long life in operation.

Further objects and advantages of the present invention will be apparent from the following description, reference being had to the accompanying drawings, wherein a preferred embodiment of one form of the present invention is clearly shown.

In the drawings:

Fig. 1 is a diagrammatic view showing the front end of an automobile chassis equipped with a hydraulic shock absorber, and also showing the thrust link interconnecting the shock absorber arm and vehicle axle by means of the pivot joint of this invention.

Fig. 2 is a side elevation on an enlarged scale of the pivot joint of this invention.

Fig. 3 is an end elevation looking in the direction of the arrow 3 in Fig. 2.

Fig. 4 is a section on line 4—4 of Fig. 3.

Similar reference characters refer to similar parts throughout the several drawings.

In Fig. 1, 10 designates the chassis side rail, 11 the front axle, 12 the semi-elliptic leaf spring connecting the frame and axle, and 13 a double cylinder hydraulic shock absorber unit which is rigidly fixed to frame 10. Unit 13 has a projecting lever arm 15 which swings about shaft 14 as an axis when axle 11 moves up and down when leaf spring 12 is flexed. The outer end of lever arm 15 is connected by means of the rigid thrust link 17 to a fitting 16 fixed to axle 11. Link 17 is pivotally connected to the outer end of arm 15 and, at its lower end, to the fitting 16, and causes lever 15 to swing up and down, as the case may be, against the resistance of the hydraulic pistons within unit 13 in a well known manner. Therefore link 17 is under compression when axle 11 is moving up, and under tension when axle 11 is moving down. The parts so far described form no part of the present invention and hence are not disclosed herein in greater detail, this invention relating to the improved form of pivot joint connecting link 17 to arm 15 and to fitting 16.

The outer end of lever arm 15 has a laterally projecting journal 20, preferably shaped as clearly shown in Fig. 4, that is, the diameter of the journal is a minimum at its central portion and gradually increases toward each end portion thereof. A one-piece resilient rubber bushing 25 is telescoped endwise upon journal 20. Preferably bushing 25 has a normal inside diameter less than that of the end portion 21 of journal 20, hence requiring that the rubber bushing be stretched somewhat in order to snap it into place upon journal 20. By this means bushing 25 is retained in place more securely with no tendency to work endwise off journal 20.

Two separate metal half sleeves 30 together form an exterior metal sleeve for the soft rubber bushing 25 when clamped in position as clearly shown in Fig. 2. Each of the half-sleeves 30 has a depending laterally extending projection 31 and 32 respectively, which projections 31, 32 mutually overlap as clearly shown in Fig. 2. The threaded end of link 17 extends somewhat loosely through hole 33 in projection 32 and is screwed into a threaded hole 34 in the projection 31. When nut 35 is screwed upwardly (as shown in Fig. 2) the projection 32 and its half sleeve 30 is first forced directly upwardly, causing the rubber bushing 25 to be clamped between the two half sleeves 30. Preferably a small depending ridge 40 is provided on the outer edge of projection 31 so that when projection 32 contacts with 31, any further tightening of nut 35 will cause a tilting movement of projection 32 relative to link 17, which tilting movement causes the half-sleeves 30 to more tightly close upon and grip the rubber bushing 25, all as will be clear from Fig. 2. The lock washer 36 prevents loosening of nut 35 after its has been set up tight to put the rubber bushing 25 under the desired initial compression and cause it to bulge outwardly at the unconfined ends thereof, as shown in Fig. 4. This compression will cause the soft rubber to grip the confining metal walls and resist relative slipping between the rubber and either the journal 20 or the exterior divided sleeve 30, 30. Hence pivotal movement of journal 20 within the exterior sleeve 30, 30 will be taken altogether by an internal distortion within the soft rubber material. Thus all relative slipping of metal parts upon each other will be avoided and all wear, looseness and rattling will be avoided.

The rubber bushings 25 may be normally of cylindrical form, that is, they may be short lengths cut off from a long cylindrical tube, whereby to reduce cost of manufacture. When such a cylindrical bushing is telescoped tightly upon the journal 20 and the half-sleeves 30, 30 clamped thereupon as above described, bushing 25 will obviously take the flared form clearly shown in Fig. 4. This flared form of journal 20 and corresponding form of exterior sleeve 30, 30 holds all the parts against endwise movement, but at the same time permits the pivot joint to yield slightly in all directions sufficiently to accommodate a small sidesway movement between chassis frame 10 and the axle 11.

The lower end of link 17 is pivotally connected to a journal 20' projecting from fitting 16 which is rigidly fixed to axle 11. Journal 20' preferably is of the same size and shape as journal 20 and the same pivot joint used at both ends of the link 17 in order to reduce the number of different parts required to be manufactured and carried in stock by dealers. However, it is obvious from Fig. 1 that the angle of pivotal movement at the lower joint will be very small compared to that at the upper joint.

While the form of embodiment of the present invention as herein disclosed, constitutes a preferred form, it is to be understood that other forms might be adopted, all coming within the scope of the claim which follows.

What is claimed is as follows:

A non-metallic isolating pivot joint connecting two relatively movable members comprising: two relatively movable members, an offset pivot journal rigid with one of said members and having its end portions of greater diameter than its central portion, an elastic rubber bushing telescoped endwise upon said journal, a divided exterior sleeve clamped radially upon said rubber bushing and confining it under initial compression, one portion of said exterior sleeve being fixed to the second movable member, the other portion of said exterior sleeve being movably mounted upon said second member and having a tilting adjustment relative to said first portion whereby it may be tilted toward said first portion to clamp the rubber bushing therebetween.

In testimony whereof I hereto affix my signature.

WILLIAM A. CHRYST.